Aug. 21, 1945. H. DREYFUS 2,383,047
PROCESS AND APPARATUS FOR THE PRODUCTION OF PLASTIC SHEET MATERIAL
Filed April 25, 1941 2 Sheets-Sheet 1
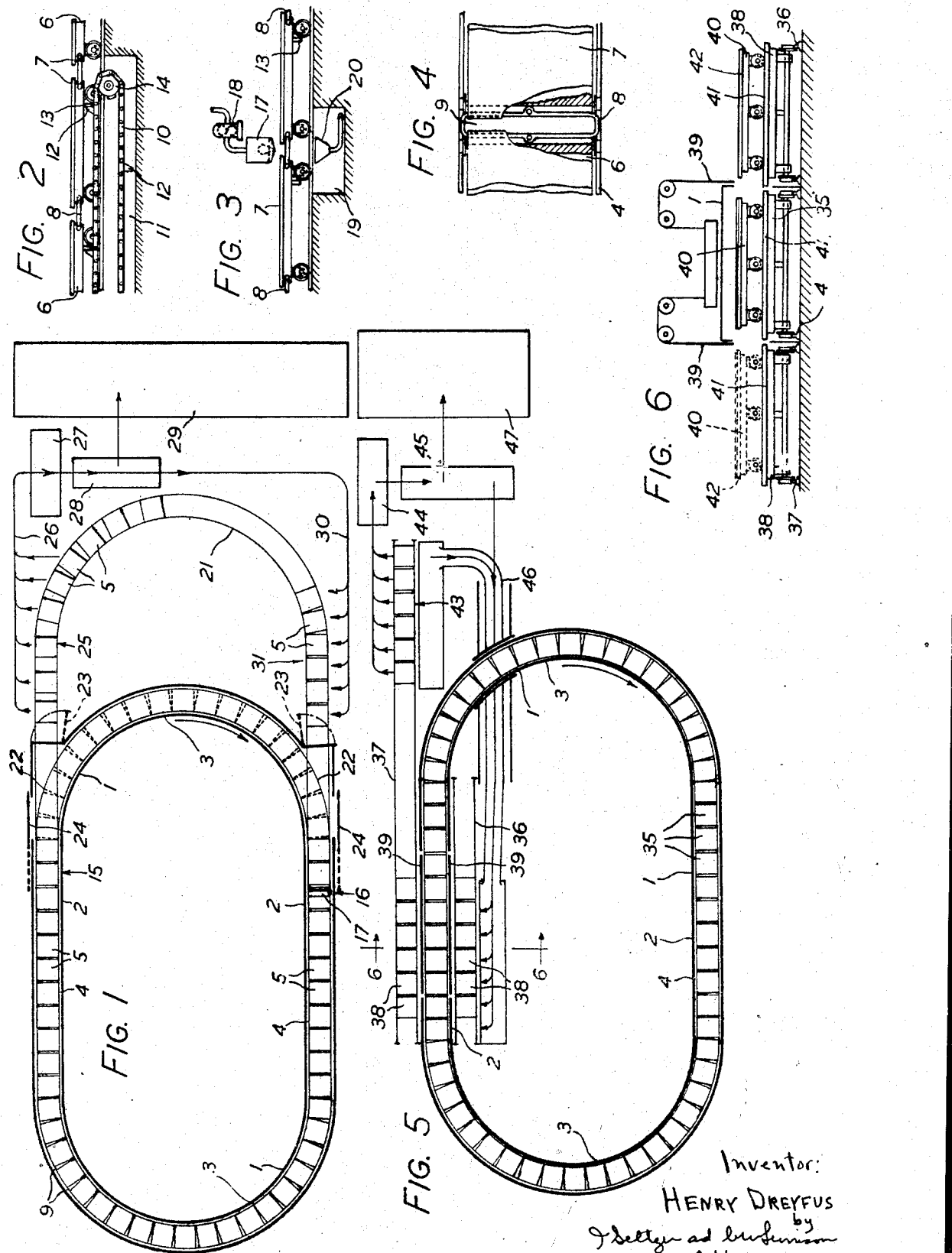
Inventor:
HENRY DREYFUS
by
Attorneys Aug. 21, 1945. H. DREYFUS 2,383,047
PROCESS AND APPARATUS FOR THE PRODUCTION OF PLASTIC SHEET MATERIAL
Filed April 25, 1941 2 Sheets-Sheet 2
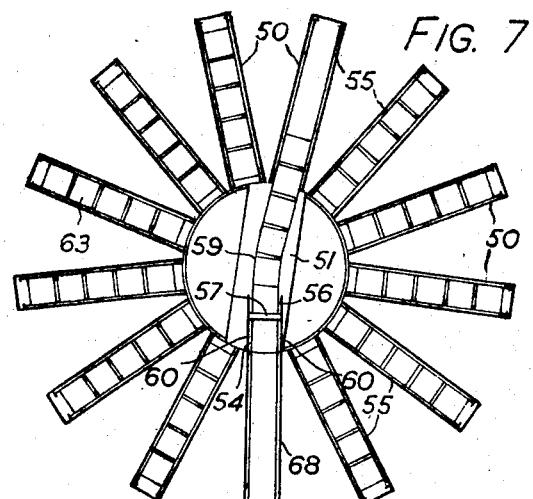
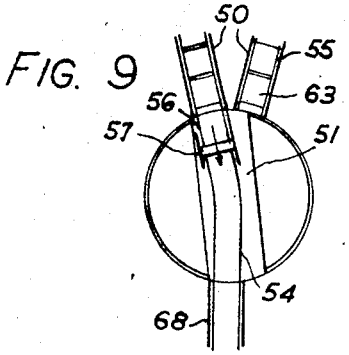
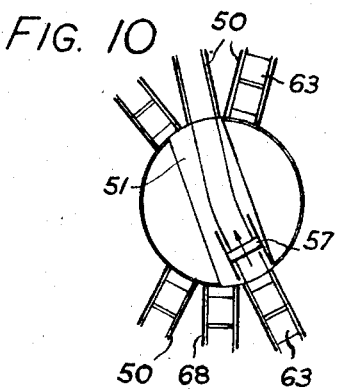
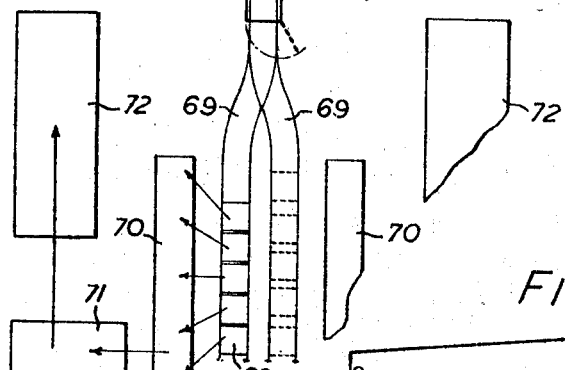
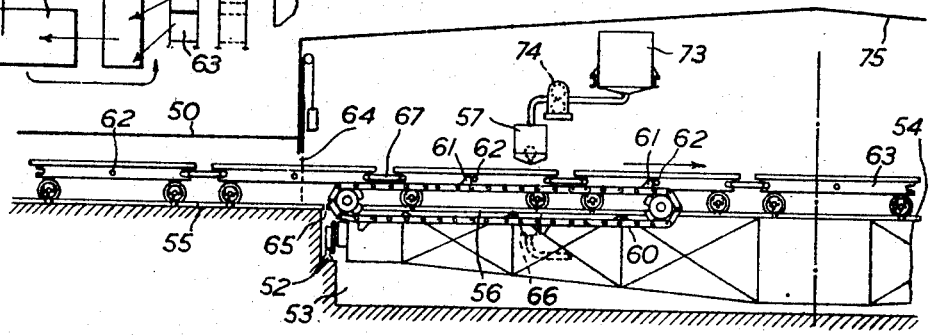
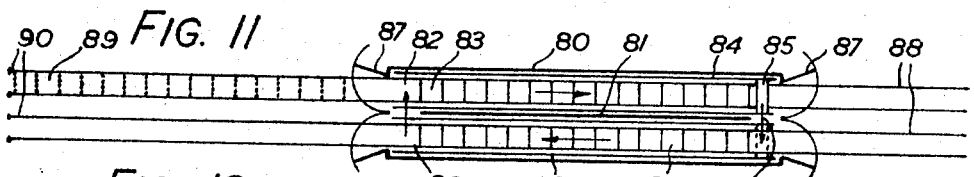
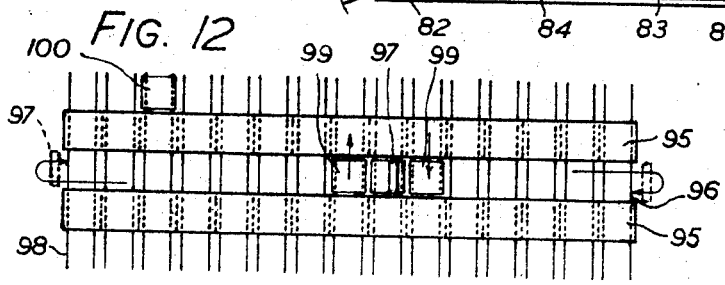
Inventor:
HENRY DREYFUS
by
Attorneys Patented Aug. 21, 1945

2,383,047

UNITED STATES PATENT OFFICE 2,383,047

PROCESS AND APPARATUS FOR THE PRODUCTION OF PLASTIC SHEET MATERIAL

Henry Dreyfus, London, England, assignor to Celanese Corporation of America, a corporation of Delaware Application April 25, 1941, Serial No. 390,355
In Great Britain May 22, 1940

8 Claims. (Cl. 18—15)

This invention relates to the production of plastic sheet material, e. g. sheets of cellulose acetate or other film-forming substance.

The production of relatively thick sheets (i. e. sheets of thickness 0.01″ and over) of cellulose acetate and like plastic materials as ordinarily practised is a complicated and time-consuming operation. A plasticiser is incorporated with the film-forming substance with the aid of a volatile solvent, the resulting mix is worked on rolls, consolidated into a block under great pressure, the sheets are cut from this block, seasoned for a period which may be many weeks depending on the thickness of the sheet, straightened and polished. The process involves costly apparatus, notably presses, and the superficial dimensions of the sheets which can be produced are limited by the size of these presses.

U. S. application S. No. 346,056 filed July 17, 1940, now U. S. Patent No. 2,332,559, describes a simpler process comprising casting the sheet from a solution of the film-forming substance in a volatile solvent containing plasticiser, on to a flat, polished, glass plate, removing a predetermined proportion of the volatile solvent, stripping the sheet from the plate and seasoning the sheet, preferably under tension. The present invention provides a process and apparatus whereby the casting of such sheets can be carried out continuously.

According to the invention a liquid film-forming composition is flowed continuously on to a series of film-casting plates, there being relative motion between the series of plates and the flowing point, the layer of composition cast on each plate is caused to set before the casting of another layer on the plate, and the plates are finally removed for the purpose of stripping the layers therefrom. Thick sheets may be built up of a plurality of superposed layers of film-forming composition by bringing the plates and the dope-box repeatedly into casting relation, each layer being substantially set before casting of the next layer, and the plates being finally removed for the stripping of the thick sheets.

The invention is of particular importance in connection with the production of sheets from a solution of cellulose acetate in a volatile solvent which is evaporated from the layer of film-forming composition to bring about setting, and the invention will be described with particular reference to this manufacture. It will be appreciated however that the film-forming composition, hereinafter referred to as the "dope," need not comprise a solution of a film-forming substance in a volatile solvent; it may, for example, comprise a film-forming substance or mixture of film-forming substances in the molten condition, with or without suitable plasticisers, or a film-forming substance adapted to be set by chemical action or by the action of heat.

Apparatus for forming sheet materials according to the invention comprises a series of trucks, each truck carrying a casting-plate, a dope-box adapted to extrude a sheet of dope substantially as wide as the plates, means for effecting relative motion between the dope-box and the trucks, lengthwise of the series of trucks, means for causing layers of dope cast on the plates to set, and means providing for the removal of the plates from the trucks for stripping of the layers.

Thus, the series of trucks may be formed as an endless train running on a closed track past a dope-box, the setting of the deposited layers being effected over the part of the track traversed by the trucks between successive passages past the dope-box. With such an endless track, the trucks themselves may be withdrawn on to an additional loop of track to permit the set layers to be stripped from the plates, or the plates may be removed from the trucks and stripped plates replaced on the trucks during the movement of the trucks round the track. The track has a straight run under the dope-box so that the layer of dope issuing from the box is delivered in uniform thickness across the width of the plates. The length of track is such that when multi-layer material is being formed, each layer is substantially set before the next layer is cast upon it.

Again, the series of trucks may be assembled as a train arranged to be driven past a dope-box, and, after the plates have had a layer of dope cast upon them, left stationary for the layers to set. Or, again, the trucks may be stationary during the casting of the layers by a moving dope-box, the trucks either remaining in the same position until the layers are set and then removed for stripping of the plates, or being withdrawn to a setting position from which they can be returned to receive another layer or removed for the stripping of the plates.

For setting of the plates by drying, a suitable chamber surrounds the trucks during the drying period. The chamber may be heated and traversed by a curent of drying medium, e. g. air, which may also be heated.

Five forms of plant for carrying out the invention are diagrammatically shown in the accompanying drawings, in which Figure 1 is a plan view of one form of plant;

Figures 2 and 3 are part-sectional elevations, and Figure 4 is a part-sectional plan of details of Figure 1;

Figure 5 is a plan of the second form of plant; and Figure 6 a part-sectional elevation to a larger scale taken on the line 6—6 of Figure 5;

Figure 7 is a plan of a further form of plant; and Figure 8 a part-sectional elevation to a larger scale of part of Figure 7;

Figures 9 and 10 are fragmentary plan views illustrating the working of Figure 7;

Figure 11 is a plan view of another form of plant, and Figure 12 is a plan view of yet another form of plant.

Referring to Figures 1-4, a drying tunnel 1 is built of two straight lengths 2 joined by two semi-circular lengths 3. An endless track 4 makes the circuit of the tunnel and provides for the circulation of an endless train of trucks 5. The trucks comprise a body 6 adapted to receive a glass plate 7 of, say, 5' x 5'. The truck bodies are connected by loop couplings 8 providing, as shown in Figure 4, a gap 9 between the ends of the trucks and between the ends of the plates 7 carried by the trucks. This gap between the trucks and plates is necessary to permit passage of the train round the curved portions 3 of the track.

The train is driven as shown in Figure 2 by means of an endless chain 10 lying partly in a pit 11 below the track 4 and carrying lugs 12 for engagement with lugs 13 projecting downwardly from the trucks. The chain sprocket 14 is driven by any suitable means (not shown) at a rate in accordance with the rate at which dope is to be cast upon the plates 7. One or more of the chains 10 may be used at suitable positions in the straight lengths 2 of the track. With the trucks making the circuit of the tunnel 1 in a clockwise direction, a driving chain 10 is advantageously placed near the point 15, for a purpose to be made clear later.

Near the point 16 a dope-box 17 is carried above the level of the trucks 6 and fed with dope by a pump 18 from any suitable supply hopper (not shown). In a pit 19 immediately below the dope-box 17 is a tray 20.

The loop coupling 8 enables dope from the continuous stream proceeding from the dope-box 17 to pass into the tray 20 as the gap between the ends of adjacent trucks passes under the dope-box.

The trucks 6 are carried through the tunnel at a steady speed so that a uniform layer of dope is deposited on the glass plate 7 at each circuit. With one dope-box in operation, the time taken to complete the circuit ensures that a previously deposited layer is sufficiently dry by the time a further layer is laid upon it. Building of layer upon layer can thus proceed until the desired thickness of sheet has been laid. When this has been done the trucks are withdrawn from the tunnel 1 on to a loop 21 to which connection is made by points 22 and doors 23, further doors 24 being provided for the uncoupling and coupling of trucks from the endless train.

Some interruption of the operation of the plant is inevitable when trucks have to be withdrawn for the removal of completed sheets, but the interruption can be minimised by removing at any one time only a fractional part of the total number of trucks employed. However, although one or two trucks could be removed it is preferable to take out some larger number, say one-quarter of the whole, and to repeat this abstraction of trucks at say four equal intervals of time so that at any one time the train contains sheets that have been built up to four different thicknesses. In this way the necessary labour can be employed to best advantage instead of having to deal with the whole number of trucks simultaneously. Moreover, the length of the loop 21 need only be sufficient for the smaller number of trucks that are at any time withdrawn from the tunnel. Figure 1 shows 15 trucks on the loop 21. These may be removed by two's and three's and may, moreover, be uncoupled from each other to facilitate attention. When trucks have been removed, the "head" of the train lies just in advance of the point 15, and the positioning of a driving chain 10 at this point enables the propulsion of the train to continue smoothly.

Near the point 25 the plates 7 are lifted from the trucks and, as shown by the arrows 26, are removed to a soaking station 27. The plates are then transferred to a stripping station 28, the plastic sheets being removed to a seasoning chamber 29 and the empty plates 7 being returned as shown by the arrows 30 to their trucks, which meanwhile have been reassembled near the point 31 for re-introduction into the tunnel 1. The trucks are recoupled, e. g. in two's and three's, on to the tail of the train just before the dope box is reached at the point 16. The relatively slow rate of movement of the trucks should permit the return of the trucks from the loop 21 in the time taken for the tail of the train to pass between the points 22 at which the loop leaves and rejoins the main track 4.

In Figure 5, a similar tunnel 1 with straight lengths 2 and semi-circular lengths 3 is traversed by a track 4 carrying an endless train of trucks 35 similar to those used in Figure 1 and driven in the same way. Alongside one of the straight runs 2 are auxiliary tracks 36, 37 each carrying a short train of similar trucks 38. The tunnel walls between the tracks 36, 37 and the main track 4 are provided with doors 39 providing access for auxiliary trucks 40 adapted to be carried on transverse rails 41 with which all the trucks, main and auxiliary, are provided. Glass plates 42 are carried by the trucks 40 to receive dope extruded by a dope-box placed near the point 16. When the desired thickness has been reached in the sheets cast on some of the trucks 40 carried by main trucks 35, the doors 39 are lifted and through them the auxiliary trucks 40 are pushed from the trucks 38 on the inner track 36, a truck 40 within the tunnel being simultaneously pushed on to a truck 38 on the outer track 37. The slow rate of dope deposition affords ample time for this transfer operation to be carried out while the trucks 35 are moving along the straight track between the doors 39 and it is merely necessary to ensure that during the transfer the two short auxiliary trains of trucks on the tracks 36, 37 move at the same rate as the trucks in the tunnel 1, this being simply effected by providing driving gear for the tracks 36, 37 similar to that employed for the main track and clutching in the auxiliary drive simultaneously at a predetermined instant. After the transfer, the doors 39 are lowered and the trucks on the outer track 37 are carried to the point 43 for the removal of the glass plates 42 carried by the auxiliary trucks 40, the plates pass to soaking and stripping stations 44, 45 and the auxiliary trucks 40 are returned to the inside of the loop of the tunnel 1 by the track 46 for replacement on the trucks 38 on the inner track 36, stripped plates from the station 45 being returned to the trucks 40. The plastic sheets removed from the plates 42 are taken to the seasoning chamber 47. The auxiliary trains on the tracks 36, 37 may be returned by hand to their starting position in readiness for the next transfer of trucks 40 through the doors 39.

In Figures 1 and 5, the trucks on which dope has been deposited are continuously in motion and form for the greater part of the operation part of an endless train which proceeds continuously through an endless drying tunnel. In Figure 7, trucks carrying glass plates similar to those used in Figures 1 and 2 are traversed past a dope-box and then remain stationary while drying takes place. For this purpose a number of drying chambers 50 surrounds a turn table 51 mounted on a rail 52 in a pit 53 which enables tracks 54 on the turn table to be brought into register with tracks 55 in each of the chambers 50. The tracks 54 do not proceed straight across the turn table 51 but comprise a straight portion 56 above which the dope-box 57 is positioned and a curve 59 leading to the other side of the turn table. An odd number of chambers 50 is used and the track 54 enables trucks to be transferred from one chamber to one of the pair of chambers lying at the other side of the turn table.

Along the straight track 56 of the turn table driving chains 60 are mounted so that lugs 61 engage lugs 62 projecting from the sides of the trucks 63. With the turn table connecting one of the chambers 50 to another containing no trucks, the trucks 63 from the full chamber are pushed through the door 64 of the chamber on to the track 54 of the turn table so that the lugs 62 are engaged by the driving lugs 61 for the trucks to be propelled at a steady rate underneath the dope-box 57. As is clear in Figure 8, the dope-box 57 is positioned sufficiently far from the ends of the turn table for the driving chain to bring the trucks to a steady speed before the leading truck receives any dope, and for any truck to be wholly clear of the small gap 65 between the tracks 54, 55. The dope-box 57 being disposed above the straight portion 56 of the track 54 steady and uniform deposition of dope takes place. Surplus dope collects in the tray 66 below the dope-box, the trucks being connected by looped couplings 67 of the kind shown in Figure 4.

The trucks 63 proceed across the turn table at a suitable speed in accordance with the thickness of the dope layer being deposited, and after the last truck has passed the dope-box and is freed from the driving chain 60 the trucks are pushed completely into the empty chamber to which the turn table directs them. The turn table is then rotated until its dope-box end (the straight run 56) registers with the newly vacated chamber, the other end of the track 54 then registering with another chamber as shown in Figure 9. The trucks from this further chamber are moved in the manner already described, past the dope-box into the empty chamber, and the turn table is once again rotated to the position shown in Figure 10. In this way all the trains 50 are connected by the turn table to an empty chamber and all the trucks receive a deposit of dope. Each short train of trucks, moreover, visits each of the chambers 50 in turn and in due course each arrives at the chamber 68, the track 55 of which is connected to two tracks 69 one of which contains a reserve train of trucks and the other of which serves to receive the trucks on which the deposit has been completed. Soaking and stripping can be carried out at the stations 70, 71, the stripped plates being returned to the trucks 63 lying in one of the tracks 69. One or more seasoning chambers 72 are provided for the plastic sheets. More than one tunnel may be connected to extension tracks such as 69 for the purpose of varying the number of layers deposited on a particular plate before that plate reaches a position from which a train can be removed for the stripping of the plate.

The turn table 51 carries a hopper 73 from which the dope-box 57 is fed by a pump 74. Preferably the turn table is enclosed by the roof 75.

In the several forms of plant described above the deposition of dope has been effected by moving a glass plate with respect to a dope-box, which, while casting is being effected, remains stationary. In Figures 11 and 12, the dope-box is arranged to move with respect to stationary plates. Referring to Figure 11, a drying chamber 80 is divided by a central wall 81 to provide space for two parallel tracks 82 each bearing a train of trucks 83. In each half of the chamber 80 tracks 84 provide for the movement of a dope-box 85 lengthwise of the trucks 83. Casting of dope takes place from left to right along one train of trucks and from right to left along the other, and advantageously the dope-box 85 may be transferred as indicated by the arrow 86 from one line of trucks to the other at the ends of the chamber 80. Casting is thus continuous except during the transfer periods, which may be very short in relation to the doping time. When the required thickness has been reached on the glass plates carried by one line of trucks and the dope-box is traversing the length of the other line of trucks the first line can be removed through one of the doors 87 on to a continuation 88 of the track 82 and a new train of trucks 89 can be carried from an extension track 90 into the chamber through another door 87. This transfer operation is effected before the dope-box 85 reaches the end of the second line of trucks so that casting proceeds continuously. Soaking and stripping of the glass plates of the trucks removed from the chamber is effected as described with reference to earlier figures and when the plates are restored to the trucks a train is prepared which, in its turn, can be returned to the chamber 80 as another train is removed from the chamber. Because the trains of trucks move only along straight tracks, the plates carried by the trucks may have their edges close to one another, so that in effect a continuous sheet is cast along the whole length of the train. Upon removal of the train from a chamber 80, the long sheet is cut or sawn between the plates to form separate sheets which can be stripped from the plates as already described.

In Figure 12, two parallel drying chambers 95 are separated by a gap 96 along which the dope-box 97 may be traversed to and fro. The chambers 95 are intersected by transverse tracks 98 each carrying a single truck 99 provided with a plate glass top. Suitable doors permit the trucks 99 to be brought from the chambers 95 into the central space 96. This transfer is effected just in advance of the moving dope-box 97 and after the passage of the dope-box the truck 99 is again returned to its chamber 95. Thus, with the dope-box moving from left to right the series of trucks 99 in the upper chamber 95 of Figure 12 are brought in turn into the central space 96, a fresh truck already being in position as the dope-box leaves a preceding truck. The trucks are returned to the same chamber 95 for the layer of dope to be set. When the dope-box makes its return movement from right to left, trucks 99 of the second series are similarly moved from the lower chamber 95 and later return to that chamber. To and fro movement of the dope box continues until the required number of layers have been deposited and the trucks are then withdrawn in turn from the chambers 95, one such truck being shown at 100. This permits removal of the glass plate for soaking and stripping and replacement of the glass plate on the truck for the return of the truck to the chamber. The removal and replacement of the plate takes place while the dope-box is casting a layer on some other truck, or, if necessary to provide sufficient drying time, while the dope-box is resting at one end of the run 96.

In all the several forms of plant the number of trucks in the series (or in the plurality of series), the rate of relative motion between the series and the dope-box, and the drying time are factors dependent on the type of dope employed and the thickness of the layer cast at each operation. The numbers of trucks shown in the figures must, therefore, be taken as merely illustrative, and consequently capable of considerable variation. For instance, the drying chambers 50 of Figure 7 could readily be extended to accommodate more trucks than five, especially if any particular dope or thickness of layer permitted a high rate of travel past the dope-box and, therefore, a higher ratio of drying-time to casting-time. The drying chambers of Figures 11 and 12 could similarly be extended or reduced in length.

The direct casting on to glass plates enables sheets to be produced with a highly polished surface. Metal plates may similarly be used, but cannot be as easily or as cheaply obtained with the desired flatness and polish as can plate glass. Some difficulty is experienced in stripping the sheets from hard surfaces of this character, especially when the sheets have been built up from several layers. Removal of the sheets from the casting plates may be effected in any convenient way, for example, as described in British application No. 7,017/40, by soaking the sheet still attached to the plate in water or benzene, or otherwise causing it to imbibe a fluid having a slight swelling action, and subsequently bending back one corner of the sheet and pulling it from the plate. As explained in the specification referred to, the use of this method of stripping the sheet material also enables the subsequent seasoning of the material to be shortened or even dispensed with, provided that the water or other liquid used to swell the sheet is a solvent for the volatile solvent present in the dope.

The plates may, however, be surfaced with a material adapted to facilitate the stripping of the sheets, such surface having the necessary high polish and being capable of ready renewal. For instance, as described in U. S. application S. No. 375,952 filed January 25, 1941, now U. S. Patent No. 2,320,431, a layer of soap or the like which may be set with a high polish may be used. The sheets can then be easily stripped, any soap or the like adhering to the sheets being suitably removed, e. g. by washing.

The process and apparatus has been described with particular reference to the production of sheets from a solution of cellulose acetate in acetone. The cellulose acetate may be of high, low or medium acetyl content. Similarly sheets of other organic substance, particularly water-resistant substances, from which self-supporting films can be made by the evaporative method, can be formed. Among such film-forming substances mention may be made of simple esters of cellulose, e. g. cellulose propionate, cellulose butyrate or cellulose nitrate, mixed esters of cellulose, e. g. cellulose acetate-propionate, cellulose acetate-butyrate, cellulose acetate-stearate, and cellulose acetate-nitrate, cellulose ethers, e. g. ethyl cellulose, propyl cellulose and benzyl cellulose, mixed ethers of cellulose, e. g. ethyl hexyl cellulose, ether-esters of cellulose, e. g. ethyl cellulose acetate, polyvinyl derivatives, e. g. polyvinyl acetate, polyvinyl chloride and the ethers, especially acetals, of polyvinyl alcohol and of partly saponified polyvinyl esters, poly-methyl methacrylate, snythetic resins of the polystyrene series and co-polymers of two or more of such polymerised vinyl derivatives or similar polymers of unsaturated substances.

Having described my invention, what I desire to secure by Letters Patent is:

1. In the method of producing plastic sheet material which comprises flowing a sheet of dope on a series of casting plates, causing said sheet of dope to set on said plates and stripping the set sheet from said plates, continuously extruding dope at a constant rate in the form of a sheet from a dope box disposed along the length of a series of casting plates, effecting repeatedly a cycle of relative motion between said dope box and said series of plates so that one passes the other once in each cycle in a direction lengthwise of said series of plates, causing the sheet of dope thereby deposited on said plates to set in the course of each cycle of motion and, after a plurality of said cycles, removing the plates from the series for the purpose of stripping the layers set thereon.

2. In an apparatus for producing plastic sheet material by flowing a sheet of dope continuously from a dope box on a series of casting plates, causing said sheet of dope to set on said plates and stripping the set sheet from said plates, a series of trucks each adapted to carry a casting plate, means for repeatedly effecting a cycle of relative motions between said series of trucks and said dope box so that the one passes the other once in each cycle in a direction lengthwise of said series of trucks, means including a chamber for causing layers of dope cast on said plates to set in the course of each cycle of motions, and doors in said chamber for permitting the entrance and exit of said trucks, the construction and arrangement being such that after a plurality of said cycles at least some of said trucks may be removed from said setting means to permit the removal of said plates from said trucks and for the stripping of said layers from said plates.

3. In an apparatus for producing plastic sheet material by flowing a sheet of dope continuously from a dope box on a series of casting plates, causing said sheet of dope to set on said plates and stripping the set sheet from said plates, a closed track running beneath said dope box, a series of trucks each adapted to carry a casting plate and forming an endless train on said track, means for driving said trucks continuously round said track so that each truck passes once in each circuit round said track beneath said dope box, means including a chamber for causing layers of dope cast on said plates to set in the course of each circuit of said track, and doors in said chamber for permitting the entrance and exit of said trucks, the construction and arrangement being such that after a plurality of said cycles at least some of said trucks may be removed from said setting means to permit the removal of said plates from said trucks and for the stripping of said layers from said plates.

4. In an apparatus for producing plastic sheet material by flowing a sheet of dope continuously from a dope box on a series of casting plates, causing said sheet of dope to set on said plates and stripping the set sheet from said plates, a closed track running beneath said dope box, a series of trucks each adapted to carry a casting plate and forming an endless train on said track, means for driving said trucks continuously round said track so that each truck passes once in each circuit round said track beneath said dope box, means including a chamber for causing layers of dope cast on said plates to set in the course of each circuit of said track, doors in said chamber for permitting the extrance and exit of said trucks, and an additional length of track operatively connected to said closed track at at least one of said doors, the construction and arrangement being such that after a plurality of said circuits at least some of said trucks may be removed from said setting means to permit the removal of said plates from said trucks and for the stripping of said layers from said plates.

5. In an apparatus for producing plastic sheet material by flowing a sheet of dope continuously from a dope box on a series of casting plates, causing said sheet of dope to set on said plates and stripping the set sheet from said plates, a closed track running beneath said dope box, a series of main trucks forming an endless train on said track, an auxiliary truck carried by each main truck and adapted to carry a casting plate, means for driving said main trucks continuously round said track so that each truck passes once in each circuit round said track beneath said dope box, means including a chamber for causing layers of dope cast on said plates to set in the course of each circuit of said track, two registering doors in said chamber, auxiliary tracks running alongside of said doors, trucks on one of said auxiliary tracks adapted to receive auxiliary trucks from said main trucks, the construction and arrangement being such, after a plurality of circuits, at least some of said auxiliary trucks may be removed from the trucks on said main track by pushing through one of said doors an empty auxiliary truck carried by a truck on one of the auxiliary tracks on to a truck on said main track thereby forcing therefrom the auxiliary truck thereon through the other of said doors on to a truck on the auxiliary track on the opposite side of said main track, to permit the removal of said auxiliary trucks and the plates carried thereon, and for the stripping of said layers from said plates.

6. In an apparatus for producing plastic sheet material by flowing a sheet of dope continuously from a dope box on a series of casting plates, causing said sheet of dope to set on said plates and stripping the set sheet from said plates, a series of trucks each adapted to carry a casting plate, means for driving said series of trucks repeatedly beneath said dope box, a chamber adapted to receive said series of trucks between successive passages beneath said dope box wherein said trucks may be left stationary for the layers cast on the plates thereon to set, and doors in said chamber for permitting the entrance and exit of said trucks, the construction and arrangement being such that after a plurality of said passages at least some of said trucks may be removed from said chamber to permit the removal of said plates from said trucks, and for the stripping of said layers from said plates.

7. In an apparatus for producing plastic sheet material by flowing a sheet of dope on a series of casting plates, causing said sheet of dope to set on said plates and stripping the set sheet from said plates, a plurality of series of trucks, each truck being adapted to carry a casting plate, a plurality of chambers radially disposed about a center and provided with tracks adapted to accommodate said series of trucks, a turn-table rotatable about said center provided with a track adapted to be operatively connected to said tracks passing through said chambers, and carrying a dope box, means for continuously extruding dope at a constant rate in the form of a sheet from said dope box, means for driving a series of trucks across said turn-table from one chamber to another whereby said trucks pass into each of said chambers and pass beneath the dope box repeatedly between said chambers, means in association with each chamber for causing layers of dope cast on said plates to set, and doors in one of said chambers for permitting the entrance and exit of said trucks, the construction and arrangement being such that some of said trucks may be removed from said chamber to permit the removal of said plates from said trucks and for the stripping of said layers from said plates.

8. In an apparatus for producing plastic sheet material by flowing a sheet of dope on a series of casting plates, causing said sheet of dope to set on said plates and stripping the set sheet from said plates, a plurality of series of trucks, each truck being adapted to carry a casting plate, a plurality of chambers radially disposed about a center and provided with tracks adapted to accommodate said series of trucks, a turn-table rotatable about said center provided with a track adapted to be operatively connected to said tracks passing through said chambers, and carrying a dope box, means for continuously extruding dope at a constant rate in the form of a sheet from said dope box, means for driving a series of trucks across said turn-table from one chamber to another whereby said trucks pass into each of said chambers and pass beneath the dope box repeatedly between said chambers, means in association with each chamber for causing layers of dope cast on said plates to set, and additional tracks extended radially outwards from one of said chambers and operatively connected thereto, the construction and arrangement being such that a series of trucks may be removed on to said additional tracks for the stripping of said layers from said plates.

HENRY DREYFUS.